United States Patent
Gruenauer et al.

(10) Patent No.: US 8,272,574 B2
(45) Date of Patent: Sep. 25, 2012

(54) DOCUMENT FOR PERSONAL IDENTIFICATION HAVING PROTECTION AGAINST EXTERNAL MANIPULATIONS AND A METHOD FOR PRODUCING

(75) Inventors: Matthias Gruenauer, Regensburg (DE); Andreas Karl, Tegernheim (DE); Andreas Mueller-Hipper, Regensburg (DE); Frank Pueschner, Kelheim (DE); Peter Scherl, Neunburg v. W. (DE)

(73) Assignee: Infineon Technologies AG, Neubiberg (DE)

( * ) Notice: Subject to any disclaimer, the term of this patent is extended or adjusted under 35 U.S.C. 154(b) by 293 days.

(21) Appl. No.: 12/570,993

(22) Filed: Sep. 30, 2009

(65) Prior Publication Data

US 2010/0084474 A1    Apr. 8, 2010

(30) Foreign Application Priority Data

Sep. 30, 2008 (DE) .......................... 10 2008 049 670

(51) Int. Cl.
*G06K 19/02* (2006.01)
*G06K 19/06* (2006.01)

(52) U.S. Cl. .................... 235/492; 235/488

(58) Field of Classification Search ................ 235/492
See application file for complete search history.

(56) References Cited

U.S. PATENT DOCUMENTS

| | | | | |
|---|---|---|---|---|
| 5,961,026 A | * | 10/1999 | Olson et al. | 228/13 |
| 6,911,911 B2 | | 6/2005 | Surkau et al. | |
| 7,059,535 B2 | * | 6/2006 | Rietzler | 235/492 |
| 7,243,840 B2 | * | 7/2007 | Bason et al. | 235/380 |
| 2006/0267204 A1 | * | 11/2006 | Takahashi et al. | 257/762 |

FOREIGN PATENT DOCUMENTS

| | | |
|---|---|---|
| DE | 10 2005 062 799 A1 | 7/2007 |
| EP | 1739596 A1 | 1/2007 |

* cited by examiner

*Primary Examiner* — Thien M. Le
*Assistant Examiner* — Toan Ly
(74) *Attorney, Agent, or Firm* — Dicke, Billig & Czaja, PLLC

(57) ABSTRACT

A document for personal identification, having a chip module including the following components: a chip and a leadframe, wherein the chip is connected to the leadframe, an outer cover, wherein the outer cover is connected to a transponder substrate. A first component of the chip module is connected to the outer cover and a second component of the chip module is connected to the transponder substrate in such a way that, in the case of separation of outer cover and transponder substrate, the first component of the chip module is separated from the second component of the chip module.

22 Claims, 5 Drawing Sheets

DOCUMENT FOR PERSONAL IDENTIFICATION HAVING PROTECTION AGAINST EXTERNAL MANIPULATIONS AND A METHOD FOR PRODUCING

CROSS-REFERENCE TO RELATED APPLICATIONS

This Utility Patent Application claims priority to German Patent Application No. DE 10 2008 049 670.7, filed on Sep. 30, 2008, and incorporated herein by reference.

BACKGROUND

The present invention relates to a document for personal identification, and to a method for producing a document for personal identification.

On account of constantly rising security requirements, diverse endeavors are being made to improve existing systems for personal identification or to create new identification possibilities which enable simplified and faster detection of person-specific data for personal identification. Since, particularly in the field of personal documents to be carried by persons, there are very different standards concerning the data detection, it has proved to be necessary not to eliminate conventional personal identification documents, such as a personal identity card, for example, without replacement but rather to modify the existing system in such a way that advanced systems such as, for example, the recognition of persons by using transponders can also be employed in a supplementary manner.

One possibility for realizing such dual identification systems consists in providing a conventional personal identity card with a transponder on which, in accordance with the personal data established in the security print of the identity paper, the data are stored in the chip module of the transponder and can be retrieved contactlessly by using a suitable reader. Security aspects have to be taken into account to an increased extent in this case. It is necessary to implement measures which prevent exchange, removal or manipulation of the personal identification transponder.

FIG. 1 illustrates a document for personal identification 100 according to the prior art in a sectional side view. A transponder inlay 120, having a chip module 30 and an antenna 32, is connected to an outer cover 110 by using an adhesive layer 50. The chip module 30 includes a chip 31 and a leadframe 33. The chip 31 and the leadframe 33 are connected to one another by using flip-chip technology, for example.

In the case of the construction illustrated in FIG. 1, the transponder inlay can be detached from the outer cover 110 using simple means, for example for the purpose of manipulation, without the chip module 30 and the antenna 32 being damaged.

For these and other reasons there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

Exemplary embodiments of the document for personal identification are explained in greater detail below with reference to the figures.

DETAILED DESCRIPTION

Figure 1:
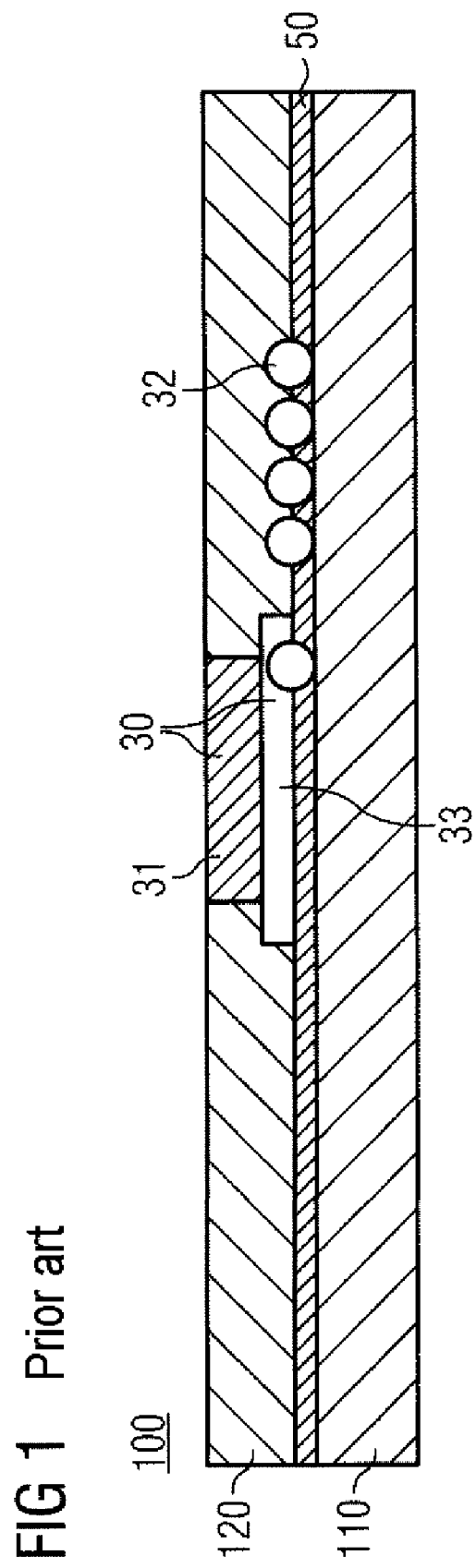
FIG. 1 illustrates a document for personal identification according to the prior art in a sectional side view.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

One or more embodiments provide a document for personal identification which affords high protection against external manipulations, in one embodiment, in the case of violent separation of laminate body and cover.

This object is achieved by using a document for personal identification including the features of claim 1, and by using a method for producing a document for personal identification including the features of claim 18.

In one embodiment, a document for personal identification includes a chip module including the following components: a chip and a leadframe, wherein the chip is connected to the leadframe, and an outer cover, wherein the outer cover is connected to the transponder substrate.

A first component of the chip module is connected to the outer cover and a second component of the chip module is connected to the transponder substrate in such a way that, in the case of separation of outer cover and transponder substrate, the first component of the chip module is separated from the second component of the chip module.

A chip module generally includes a chip and a leadframe, wherein the chip is electrically connected to the leadframe, for example by using bonding wires. However, the chip can also be directly connected to the leadframe by using flip-chip technology. The connection of the first component of the chip module, for example the chip, to the outer cover and the second component of the chip module, for example the leadframe, to the transponder substrate ensures that, in the case of violent separation of transponder substrate and outer cover, the chip module is separated at the connecting points between the chip and the leadframe and is thus destroyed. This presupposes that the connection between the outer cover and the first component of the chip module and also between the transponder substrate and the second component of the chip module more stable and stronger than the connection between the chip and the leadframe. The chip module is destroyed by the separation of chip and leadframe. The chip can thus no longer be read, manipulated or introduced into another document for personal identification. The document for personal identification therefore affords high protection against manipulations externally.

In one embodiment, one method for producing a document for personal identification having an outer cover, a transponder substrate and having a chip module, including the following components: a chip and a leadframe, wherein the chip is connected to the leadframe, has the following processes:

connecting a first component of the chip module to the outer cover; and connecting a second component of the chip module to the transponder substrate, such that the outer cover and the transponder substrate are at least indirectly connected to one another and, in the case of separation of outer cover and transponder substrate, the first component of the chip module is separated from the second component of the chip module.

In one method, the connection between the first component of the chip module and the outer cover and also between the second component of the chip module and the transponder substrate is stronger and more stable than the connection between the chip and the leadframe.

In one embodiment of the document for personal identification, the outer cover has a first cutout for at least partly receiving the first component of the chip module. The first component of the chip module can be either the chip or the leadframe. Through the first cutout, the first component of the chip module is embedded into the outer cover well. If the chip, for example, is embedded into the outer cover, then firstly it is well protected against damage and secondly it does not stick out on the surface of the outer cover. In order to improve the connection between the first component of the chip module and the outer cover, an adhesive layer can additionally be arranged between the first component of the chip module and the outer cover. Adhesive including epoxy resin can be used here, for example.

However, it is also possible to realize the connection between the first component of the chip module and the outer cover by using a force-locking connection. A force-locking connection arises for example by using a press fit between the chip or respectively the leadframe and the outer cover. In a further exemplary embodiment, the force-locking connection can be supplemented with an adhesive layer between the first component of the chip module and the outer cover.

In a further exemplary embodiment, the transponder substrate has a cutout for at least partly receiving the second component of the chip module. An adhesive layer can likewise be arranged between the transponder substrate and the second component of the chip module. This adhesive layer can also be arranged in the cutout in the transponder substrate. A good adhesive connection is obtained if the adhesive layer includes epoxy resin. In a further exemplary embodiment, a force-locking connection can exist between the leadframe or respectively the chip and the transponder substrate. It is also possible for there to be an adhesive connection in addition to the force-locking connection.

In another embodiment, for connection of transponder substrate and outer cover, a third adhesive layer can likewise be arranged between the transponder substrate and the outer cover. The adhesive layer can include epoxy resin.

The document for personal identification can furthermore include an antenna. The antenna of the transponder unit is generally connected to the leadframe. The antenna can in this case be a wire antenna or an etched or printed antenna. The antenna can be embodied in the form of a coil having at least one turn.

In a further embodiment of the document for personal identification, the antenna has a first antenna section and a second antenna section, wherein the first antenna section is at least substantially embedded in the transponder substrate and the second antenna section is at least substantially embedded in the outer cover or a further layer. With this arrangement, in the case of violent separation of the individual layers, besides the separation of chip and leadframe, the antenna is likewise destroyed.

The outer cover and/or the transponder substrate can be formed in multilayer fashion, wherein one layer can be formed from a foamed plastic. The foamed plastic allows for the adhesive to be taken up in an easier manner.

In one exemplary embodiment of a method for producing a document for personal identification, the outer cover and the transponder substrate can be connected, for example by using an adhesive layer. Furthermore, a first cutout can be introduced into the outer cover. This can be realized by using a milling method, for example. A first component of the chip module, for example a chip, is subsequently arranged in the first cutout.

In a further exemplary embodiment of the method according a cutout is introduced into the transponder substrate. This can likewise be done by using a milling method. The second component of the chip module, for example the lead frame, is subsequently arranged in the cutout in the transponder substrate. A first adhesive layer can be arranged between the first component of the chip module and the outer cover in order to produce a good connection. Furthermore, in order to produce a good connection between the second component of the chip module and the transponder substrate, a second adhesive layer can be arranged between the second component of the chip module and the transponder substrate.

Figure 2:
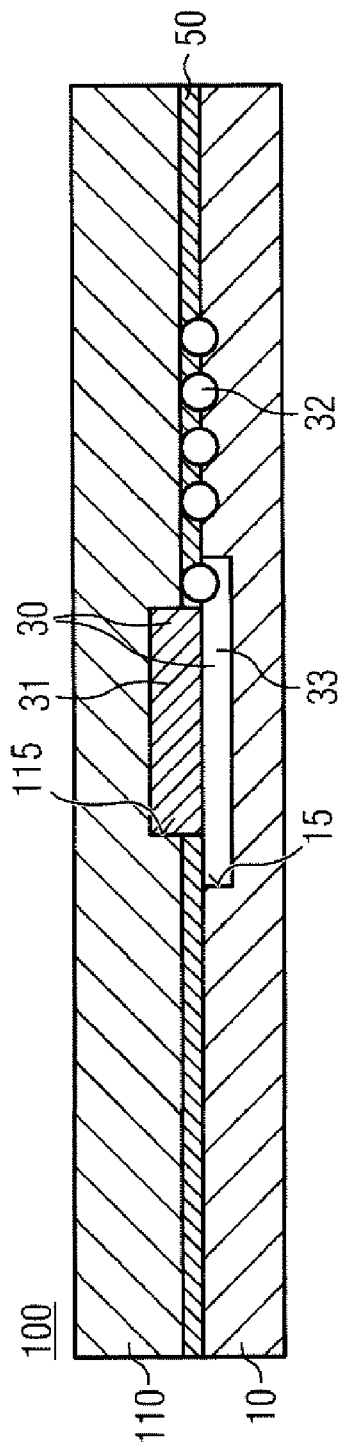
FIG. 2 illustrates a first exemplary embodiment of a document for personal identification in a sectional side view.

FIG. 2 illustrates a first exemplary embodiment of a document for personal identification 100 in a sectional side view. A chip 31 of a chip module 30 is arranged in a cutout 115 of an outer cover 110, referred to as first cutout hereinafter. The chip module 30 has, besides the chip 31, a leadframe 33. In one embodiment, the chip 31 and the leadframe 33 are connected to one another by using flip-chip technology, for example. In this exemplary embodiment, the leadframe 33 is arranged in a cutout 15, referred to as second cutout hereinafter, which is situated in a transponder substrate 10. The transponder substrate 10 is connected to the outer cover 110 by using an adhesive layer 50, referred to as second adhesive layer hereinafter. For the purpose of power supply and for data transmission, an antenna 32 is connected to the chip module 30.

Figure 3:
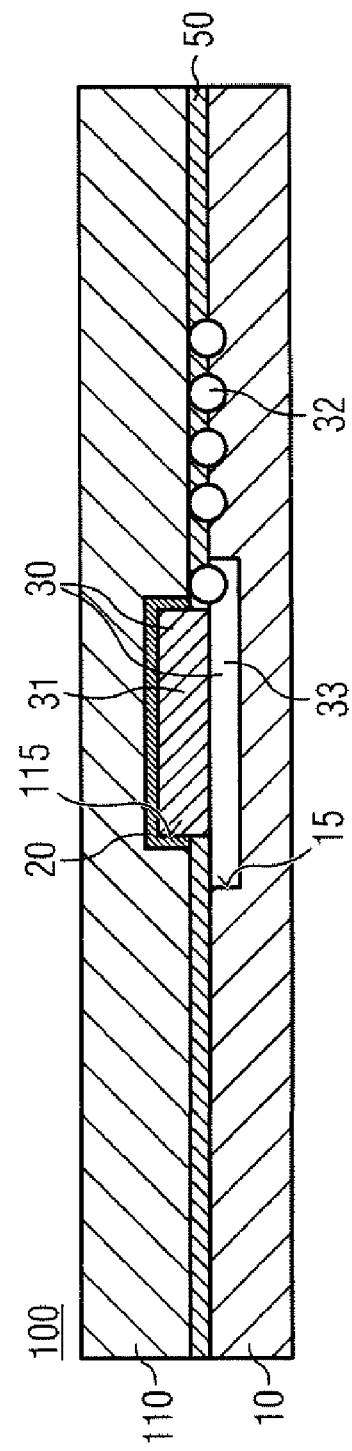
FIG. 3 illustrates a second exemplary embodiment of a document for personal identification in a sectional side view.

FIG. 3 illustrates a second exemplary embodiment of a document for personal identification 100 in a sectional side view. In contrast to the illustration in FIG. 2, FIG. 3 additionally has an adhesive layer 20, referred to as first adhesive layer hereinafter, in the first cutout 115 in the outer cover 110. A very firm connection between the chip 31 and the outer cover 110 is produced by the first adhesive layer 20. As in FIG. 2, the leadframe 33 is arranged in the second cutout 15 of the transponder substrate 10. The outer cover 110 and the transponder substrate 10 are likewise connected to one another by using a second adhesive layer 50.

Figure 4:
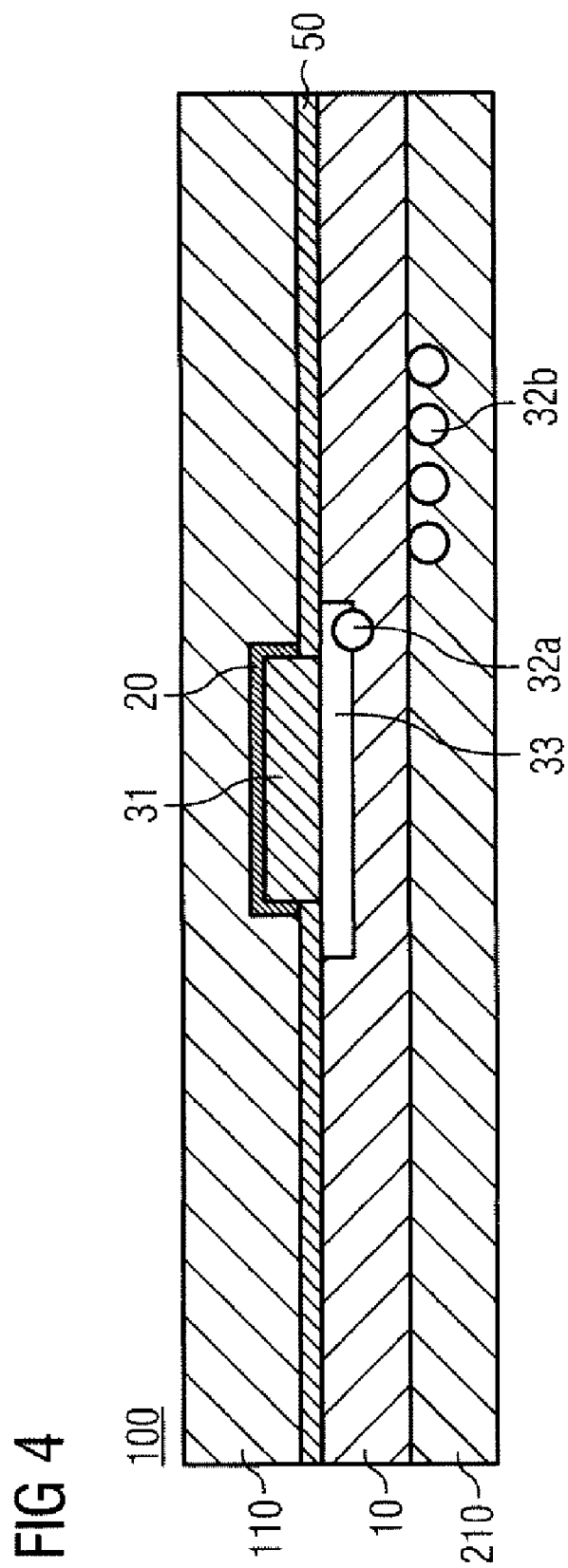
FIG. 4 illustrates a third exemplary embodiment of a document for personal identification in a sectional side view.

FIG. 4 illustrates a third exemplary embodiment of a document for personal identification 100 in a sectional side view. In contrast to the illustration in FIG. 3, the illustration in FIG. 4 has an additional covering layer 210. In the exemplary embodiment in FIG. 4, the antenna includes a first antenna section 32a and a second antenna section 32b. The first antenna section 32a is at least substantially embedded in the transponder substrate 10 and the second antenna section 32b is substantially embedded in the additional covering layer 210. As in FIG. 3, the chip 31 is arranged in a first cutout in the outer cover 110 and connected to the outer cover 110 by using the first adhesive layer 20. The leadframe 33 is situated in a second cutout in the transponder substrate 10. The transponder substrate 10 is connected to the outer cover 110 by using a second adhesive layer 50.

If outer cover 110 and transponder substrate 10 were pulled apart, the chip 31 would remain in the first cutout in the outer cover 110 and the leadframe would remain in the second cutout in the transponder substrate 10. The chip module 30 would be destroyed by the separation of chip 31 and leadframe 33. A read-out or manipulation of the chip 31 would not be possible, or would be possible only with high outlay. In the event of a further conceivable attempt at manipulation, if transponder substrate 10 and covering layer 210 were separated, separation of the antenna would occur. The first antenna section 32a would remain in the transponder substrate 10, while the second antenna section 32b would remain in the covering layer.

Figure 5:
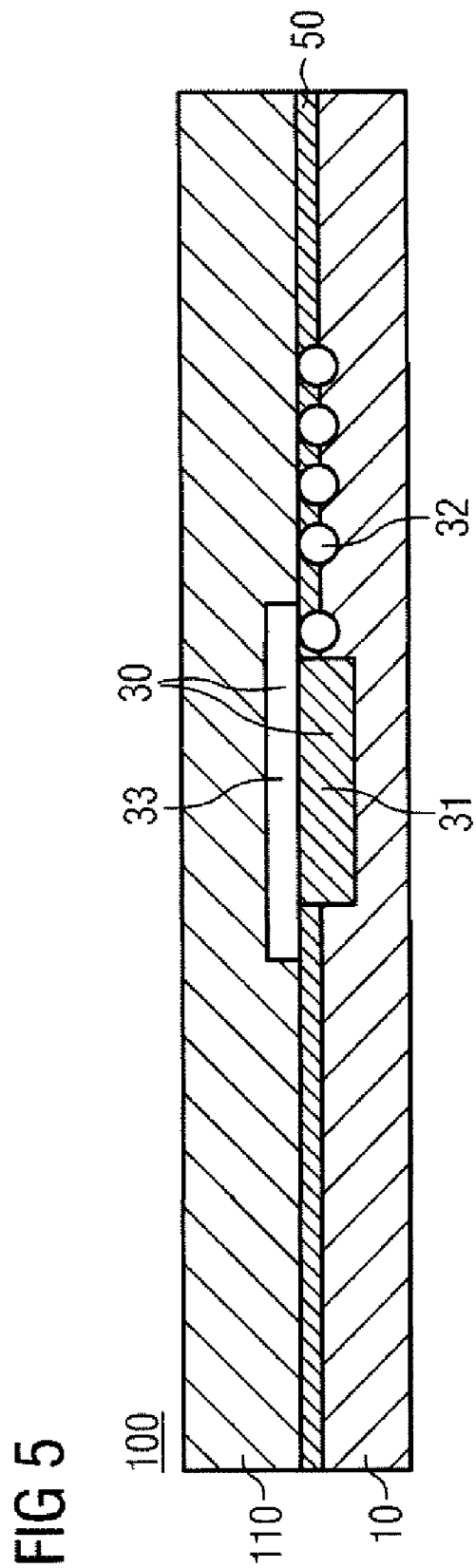
FIG. 5 illustrates a fourth exemplary embodiment of a document for personal identification in a sectional side view.

FIG. 5 illustrates a fourth exemplary embodiment of a document for personal identification 100 in a sectional side view. In contrast to the previous FIGS. 2, 3 and 4, here a leadframe 33 is situated in a first cutout in the outer cover 110. A chip 31 is substantially situated in a second cutout in the transponder substrate 10. An antenna 32 is connected to the leadframe 33. A second adhesive layer 50 is arranged between the outer cover 110 and the transponder substrate 10.

Figure 6:
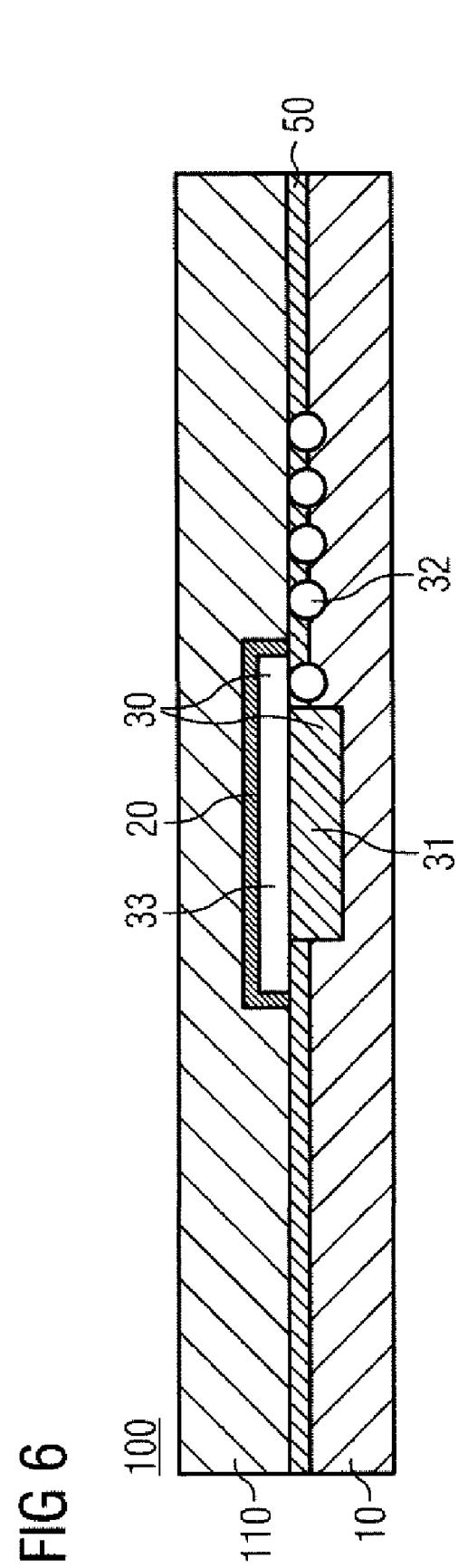
FIG. 6 illustrates a fifth exemplary embodiment of a document for personal identification in a sectional side view.

FIG. 6 illustrates a fifth exemplary embodiment of a document for personal identification in a sectional side view. In contrast to FIG. 5, here an additional, first adhesive layer 20 is arranged in the first cutout. This additional, first adhesive layer 20 results in a better connection between the leadframe 33 and the outer cover 110. As in FIG. 5, a chip 31 is substantially arranged in the transponder substrate 10. An antenna 32 for contactless data transmission is additionally connected to the leadframe 30.

It is to be understood that the features of the various exemplary embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A document for personal identification, comprising:
a chip module comprising the following components: a chip and a leadframe, wherein the chip is connected to the leadframe; and
an outer cover, wherein the outer cover is connected to a transponder substrate;
wherein the chip of the chip module is connected to the outer cover and the leadframe of the chip module is connected to the transponder substrate such that, in the case of separation of outer cover and transponder substrate, the chip of the chip module is separated from the leadframe of the chip module; and
wherein the outer cover has a first cutout for at least partly receiving the chip of the chip module.

2. The document of claim 1, wherein a first adhesive layer is arranged between the chip of the chip module and the outer cover.

3. The document of claim 2, wherein the first adhesive layer comprises epoxy resin.

4. The document of claim 1, wherein a force-locking connection exists between the chip of the chip module and the outer cover.

5. The document of claim 1, wherein the transponder substrate has a second cutout for at least partly receiving the leadframe of the chip module.

6. The document of claim 1, wherein a force-locking connection exists between the leadframe of the chip module and the transponder substrate.

7. The document of claim 1, further comprising an antenna.

8. The document of claim 7, wherein the antenna is a wire antenna.

9. The document of claim 7, wherein the antenna is a coil having at least one turn.

10. The document of claim 7, wherein the antenna has a first antenna section and a second antenna section, wherein the first antenna section is at least substantially embedded in the transponder substrate and the second antenna section is at least substantially embedded in a further covering layer.

11. The document of claim 1, wherein the outer cover and/or the transponder substrate are/is formed in multilayer fashion.

12. The document of claim 1, wherein the transponder substrate is formed from a foamed plastic.

13. A document for personal identification, comprising:
a chip module comprising the following components: a chip and a leadframe, wherein the chip is connected to the leadframe; and
an outer cover, wherein the outer cover is connected to a transponder substrate;
wherein the chip of the chip module is connected to the outer cover and the leadframe of the chip module is connected to the transponder substrate such that, in the case of separation of outer cover and transponder substrate, the chip of the chip module is separated from the leadframe of the chip module;
wherein a first adhesive layer is arranged between the chip of the chip module and the outer cover;
wherein a second adhesive layer is arranged between the leadframe of the chip module and the transponder substrate; and
wherein the outer cover has a first cutout for at least partly receiving the chip of the chip module.

14. The document of claim 13, wherein the second adhesive layer comprises epoxy resin.

15. The document for personal identification of claim 13, wherein a third adhesive layer is arranged between the transponder substrate and the outer cover.

16. The document of claim 15, wherein the third adhesive layer comprises epoxy resin.

17. The document of claim 13, wherein the transponder substrate has a second cutout for at least partly receiving the leadframe of the chip module.

18. A method for producing a document for personal identification having an outer cover, a transponder substrate and having a chip module, comprising the following components: a chip and a leadframe, wherein the chip is connected to the leadframe, including:
- connecting the chip of the chip module to the outer cover;
- connecting the leadframe of the chip module to the transponder substrate, such that the outer cover and the transponder substrate are at least indirectly connected to one another and, in the case of separation of outer cover and transponder substrate, the chip of the chip module is separated from the leadframe of the chip module;
- forming a first cutout in the outer cover; and
- arranging the chip of the chip module in the first cutout.

19. The method of claim 18 comprising:
connecting the outer cover to the transponder substrate.

20. The method of claim 18 comprising:
forming a second cutout in the transponder substrate;
arranging the leadframe of the chip module in the second cutout.

21. The method of claim 18 comprising:
wherein a first adhesive layer is arranged between the chip of the chip module and the outer cover.

22. The method of claim 21 comprising:
wherein a second adhesive layer is arranged between the leadframe of the chip module and the transponder substrate.

* * * * *